United States Patent
Tamura (10) Patent No.: US 7,873,270 B2
(45) Date of Patent: Jan. 18, 2011

(54) INTERCHANGEABLE LENS TYPE CAMERA SYSTEM AND CAMERA BODY

(75) Inventor: Akihiro Tamura, Osaka (JP)

(73) Assignee: Panasonic Corporation, Osaka (JP)

( * ) Notice: Subject to any disclaimer, the term of this patent is extended or adjusted under 35 U.S.C. 154(b) by 37 days.

(21) Appl. No.: 12/405,384

(22) Filed: Mar. 17, 2009

(65) Prior Publication Data

US 2009/0238553 A1 Sep. 24, 2009

(30) Foreign Application Priority Data

Mar. 18, 2008 (JP) .............................. 2008-069028

(51) Int. Cl.
*G03B 17/20* (2006.01)
*H04N 5/222* (2006.01)
*G02B 7/02* (2006.01)

(52) U.S. Cl. .................. 396/296; 396/529; 348/333.01; 348/333.04; 359/827

(58) Field of Classification Search .................. 396/296, 396/281, 529, 530, 531, 532, 533; 348/335, 348/340, 333.01, 333.02, 333.04; 359/642, 359/819, 827, 828

See application file for complete search history.

(56) References Cited

U.S. PATENT DOCUMENTS

| 5,600,371 A | 2/1997 | Arai |
| 6,392,702 B1 * | 5/2002 | Arai et al. .................. 348/335 |
| 2002/0118968 A1 | 8/2002 | Takahashi |

FOREIGN PATENT DOCUMENTS

| JP | 4-204638 A | 7/1992 |
| JP | 11-119319 A | 4/1999 |
| JP | 2002-250964 A | 9/2002 |
| JP | 2005-164966 A | 6/2005 |
| JP | 2006-038924 A | 2/2006 |

* cited by examiner

*Primary Examiner*—Rochelle-Ann J Blackman
(74) *Attorney, Agent, or Firm*—Panasonic Patent Center; Dhiren Odedra; Kerry Culpepper (57) ABSTRACT

An interchangeable lens type camera system includes a camera body and an interchangeable lens mountable to the camera body. An error detector detects whether a communication error occurs between a communication unit of the camera body and a communication unit of the interchangeable lens. A display unit displays a first error handling message when the error detector detects the communication error at a time of activation of the interchangeable lens, and displays a second error handling message when the error detector detects the communication error after activation of the interchangeable lens.

19 Claims, 3 Drawing Sheets

INTERCHANGEABLE LENS TYPE CAMERA SYSTEM AND CAMERA BODY

BACKGROUND

1. Technical Field

The technical field relates to an interchangeable lens type camera system including a camera body and an interchangeable lens mountable to the camera body, and a camera body. More particularly, the technical field relates to an interchangeable lens type camera system and a camera body, capable of communicating between a camera body and an interchangeable lens and displaying an error on the camera body.

2. Related Art

Interchangeable lens type camera systems including a camera body and an interchangeable lens have been conventionally known. Furthermore, there is an interchangeable lens type camera system in which a camera body and an interchangeable lens communicate with each other. In such an interchangeable lens type camera system, for example, the interchangeable lens sends optical information of the interchangeable lens to the camera body. Based on the information, the camera body sends to the interchangeable lens a command to drive an aperture and a focusing lens in the interchangeable lens. In this manner, the camera body controls the interchangeable lens.

The interchangeable lens type camera system is provided with a detection means for detecting that the interchangeable lens has been attached to the camera body. When detecting with the detection means that the interchangeable lens has been attached thereto, the camera body attempts to communicate with the interchangeable lens. When the camera body has successfully communicated with the interchangeable lens, the camera body allows a normal shooting operation. On the other hand, when a communication error has occurred, the camera body determines that normal shooting cannot be performed due to an abnormality in the interchangeable lens. Hence, the camera body first prohibits a release operation. Then, when a user forcedly allows the release operation with a means for allowing release operation, the camera body allows a shooting operation with limited shooting functions. For example, JP-A-2006-038924 discloses an interchangeable lens type camera system that operates in the above-described manner.

There is also known an interchangeable lens type camera system in which, determining that normal shooting cannot be performed due to an abnormality in an interchangeable lens when a communication error occurs, a camera body sends to the interchangeable lens a reset signal to make the interchangeable lens perform an initialization operation (see, for example, JP-A-2005-164966).

Furthermore, there is an interchangeable lens type camera system in which, when a monitoring program detects a warning or error in any of the units of a camera body, the camera body notifies a user of which unit has an abnormality, by displaying a corresponding mark in a blinking manner (see, for example, JP-A-11-119319).

Also, there is an interchangeable lens type camera system having a camera body and an interchangeable lens mountable to the camera body, in which the camera body supplies power to the interchangeable lens. In the interchangeable lens type camera system, the camera body includes a power supply that supplies power to the interchangeable lens; a monitoring unit for monitoring a supplied voltage to be supplied to the interchangeable lens from the power supply; a detector for detecting an abnormality in power supply based on an output from the monitoring unit; and a controller for starting or stopping power supply to the interchangeable lens from the power supply, which stops the power supply when the detector detects an abnormality (see, for example, JP-A-2002-250964).

The interchangeable lens type camera system disclosed in JP-A-11-119319 can securely inform the user of a warning or error in any of the units and can easily notify the user of the error unit. However, the user does not know how to handle the warning or error. Furthermore, since the system only notifies the user, with a combination of light-up and blinking of an LED that there is a unit being in a warning or error state, the user needs to check by him/herself each unit of the interchangeable lens type camera system to find the unit being in a warning or error state, and then find out a method of handling a warning or error. Such a process is very cumbersome to the user.

In the interchangeable lens type camera systems disclosed in JP-A-2006-038924, JP-A-2005-164966, and JP-A-2002-250964, a prohibit release operation, stopping power supply to the interchangeable lens, or sending a reset signal for an initialization operation of the interchangeable lens is performed without securely informing the user of a warning or error in the units. Hence, the user has no idea why release operation is prohibited, why power supply is stopped, or why reset is done, and the user needs to check each unit of the interchangeable lens type camera system by him/herself. Such a process is very cumbersome to the user.

SUMMARY

To solve the above-described problems, an object is therefore to provide an interchangeable lens type camera system and a camera body that are capable of showing a user an appropriate handling method when a communication error occurs.

An interchangeable lens type camera system according to one aspect includes a camera body having a first communication unit, and an interchangeable lens mountable to the camera body and having a second communication unit operable to communicate with the first communication unit. The camera body includes an error detector operable to detect whether a communication error occurs between the first communication unit and the second communication unit, and a display unit operable to display a first error handling message when the error detector detects the communication error at a time of activation of the interchangeable lens, and display a second error handling message when the error detector detects the communication error after activation of the interchangeable lens.

The time of activation of the interchangeable lens may be no later than the time the camera body receives predetermined information from the interchangeable lens. The predetermined information may be information indicating that the interchangeable lens has completed an activation process. Alternatively, the predetermined information may be information on the interchangeable lens, which is stored in the interchangeable lens.

The first error handling message may be a message for prompting a user to remount the interchangeable lens, and the second error handling message may be a message for prompting the user to power on the camera body again.

The display unit may display a third error handling message when it is determined that there is abnormality in driving the interchangeable lens in cases where the error detector detects timeout or abnormal data in communication data. The third error handling message may be a message indicating an abnormal state of the interchangeable lens.

A camera body according to another aspect is a camera body to which an interchangeable lens having a second communication unit is mountable. The camera body includes a first communication unit operable to communicate with the second communication unit, an error detector operable to detect whether a communication error occurs between the first communication unit and the second communication unit, and a display unit operable to display an error handling message. The display unit displays a first error handling message when the error detector detects the communication error at a time of activation of the interchangeable lens, and display a second error handling message when the error detector detects the communication error after activation of the interchangeable lens.

The aforementioned interchangeable lens type camera system and camera body have an advantage of being able to show a user an appropriate handling method when an error occurs.

DETAIL DESCRIPTION OF THE PREFERRED EMBODIMENTS

Embodiments will be described below with reference to the accompanying drawings.

Embodiments of the interchangeable lens type camera system and a camera body achieve the object of showing a user an appropriate handling method when a communication error occurs, with a simple configuration and a combination of communication error detection and error handling message display.

1. Configuration

Figure 1:
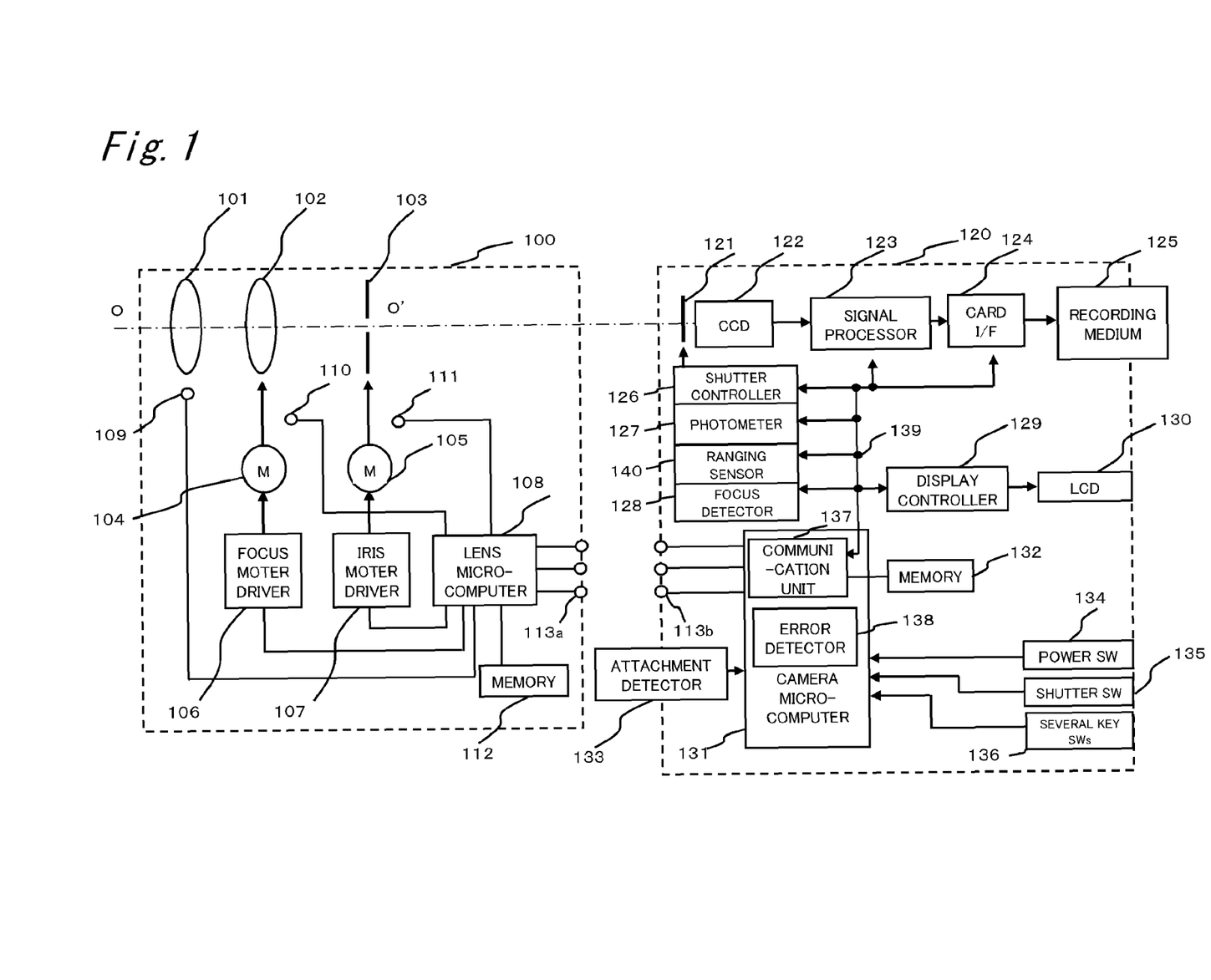
FIG. 1 is a block diagram of an embodiment of an interchangeable lens type camera system.

FIG. 1 is a block diagram showing a configuration of an interchangeable lens type camera system according to one embodiment. As shown in FIG. 1, the interchangeable lens type camera system according to the present embodiment includes an interchangeable lens 100 and a camera body 120.

1-1. Interchangeable Lens

The interchangeable lens 100 includes a zoom lens 101, a focus lens 102, an iris 103, a focus motor 104, an iris motor 105, a focus motor driver 106, an iris motor driver 107, a lens microcomputer 108, a zoom encoder 109, a focus encoder 110, an iris encoder 111, a memory 112, and first communication terminals 113a.

The lens microcomputer 108 controls drive of the focus motor 104 and the iris motor 105 of the interchangeable lens 100 by the focus motor driver 106 and the iris motor driver 107 to cause the focus lens 102 and the iris 103 to operate. The lens microcomputer 108 further computes an iris amount and a focus lens position of the focus lens 102 and the iris 103, based on position information of the focus lens 102 detected by the focus encoder 110 and position information of the iris 103 detected by the iris encoder 111. Also, the lens microcomputer 108 can serially communicate with a camera microcomputer 131 through the communication terminals 113a and communication terminals 113b to control drive of the focus motor driver 106 and the iris motor driver 107, based on drive information sent from the camera microcomputer 131. Moreover, the lens microcomputer 108 can send various information of the interchangeable lens 100 (e.g., aperture value and focus lens position) to the camera microcomputer 131 via serial communication.

The memory 112 is composed of a nonvolatile memory such as an EEPROM for example, and stores lens data used for controlling operation of the interchangeable lens 100. Lens data is data specific to the interchangeable lens 100 and is set for each type or model of interchangeable lens 100. For example, the lens data includes information such as a lens ID, an aperture size, a lens driving coefficient, and a zoom range.

The zoom lens 101 moves in an optical axis direction (an O-O' direction in FIG. 1) according to a turn operation of a zoom ring (not shown) by a user, to zoom in or out an optical image entering the camera body 120. A position of the zoom lens 101 is read by the zoom encoder 109 and information on the position is sent to the lens microcomputer 108. Note that the movement of the zoom lens 101 is not limited to manual movement by the zoom ring and may be motorized movement by a motor or the like.

The focus lens 102 can be moved in the optical axis direction by the focus motor 104 for focusing an optical image in the camera body 120. Operation of the focus motor 104 is controlled by the focus motor driver 106 such that the focus lens 102 moves in a predetermined movement direction by a predetermined amount of movement. A position of the focus lens 102 is read by the focus encoder 110 and information on the position is sent to the lens microcomputer 108.

The iris 103 is driven by the iris motor 105 to increases or decreases an amount of light passing through the interchangeable lens 100. Operation the iris motor 105 is controlled by the iris motor driver 107 to set the iris 103 to a predetermined aperture size. An aperture size of the iris 103 is detected by the iris encoder 111 and information on the aperture size is sent to the lens microcomputer 108.

1-2. Camera Body

The camera body 120 includes a shutter 121, a CCD 122 as an imaging device, a signal processor 123, a card interface 124, an information recording medium 125, a shutter controller 126, a photometer 127, a ranging sensor 140, a focus detector 128, a display controller 129, a liquid crystal display (LCD) unit 130, a camera microcomputer 131, a memory 132, an attachment detector 133, a power switch 134, a shutter switch 135, various key switches 136, second communication terminals 113b, a communication unit 137, an error detector 138, and a bus 139 operable to send and receive a signal with each unit.

The camera body 120 also includes a mechanical mechanism (not shown) operable to attach and detach the interchangeable lens 100. When the interchangeable lens 100 is attached to the camera body 120, the communication terminals 113a of the interchangeable lens 100 are electrically connected to the communication terminals 113b of the camera body 120, enabling data communication between the interchangeable lens 100 and the camera body 120 through the communication unit 137.

The lens microcomputer 108 and the first communication terminals 113a are an example of second communication unit, and the communication unit 137 and the second communication terminal 113b are an example of first communication unit. The error detector 138 is an example of error detector. The display controller 129 and the liquid crystal display unit 130 are an example of display unit.

The camera microcomputer 131 controls the operation of each unit of the camera body 120. Also, the camera microcomputer 131 measures a distance to a subject using an existing algorithm, based on an output value of the ranging sensor 140, to compute an amount of lens movement of the focus lens 102. Information on the computed amount of lens movement is sent to the lens microcomputer 108 by the communication unit 137 through the second communication terminals 113b and the first communication terminals 113a. The error detector 138 monitors occurrence of a communication error in the above sending. The communication error includes timeout which occurs when a response is not returned from the lens microcomputer 108 within a predetermined time. In addition to this, there may be other schemes for detecting a communication error, based on codes added for error checking, such as parity check, checksum, and CRC.

The camera microcomputer 131 can write lens data sent from the lens microcomputer 108 to the memory 132 or read lens data stored in the memory 132. Also, the camera microcomputer 131 can perform power on/off control of the camera body 120 and the interchangeable lens 100, operation control of the shutter 121 through the shutter controller 126, various operation control based on operations performed on the various key switches 136, and the like. The camera microcomputer 131 performs signal communication with each unit through the bus 139. Note that although in the present embodiment the camera microcomputer 131 includes the communication unit 137 and the error detector 138, the configuration is not limited thereto.

The display controller 129 controls the liquid crystal display unit 130 to display the amount of battery left in the interchangeable lens type camera system, the number of pictures taken, a Tv value (shutter speed value), an Av value (aperture size), an exposure correction value, error information, and the like. Note that although in the present embodiment the liquid crystal display unit 130 is composed of a liquid crystal display device (LCD), any other display device can be used as long as the display device can display information. Note also that although in the present embodiment it is configured that the various pieces of above-described information are displayed on the liquid crystal display unit 130, the liquid crystal display unit 130 may be composed of a color liquid crystal display device and a video signal (e.g., a through-the-lens image or an image already taken) to be outputted from the signal processor 123 may be displayed together with the above-described various information.

The focus detector 128 includes a line sensor for performing auto-focus (hereinafter, referred to as "AF") by an existing phase difference detection scheme, and a circuit unit for reading information from the line sensor and storing the data. Operation of the focus detector 128 is controlled by the camera microcomputer 131. Note that the focus detector 128 may use a contrast detection method to conduct AF based on the contrast of an optical image on the CCD 122.

The photometer 127 is controlled by the camera microcomputer 131 to measure (meter) an amount of light in a subject and send information on the measured amount of light to the camera microcomputer 131. Note that the photometer 127 may measure (meter) an amount of light in a subject based on the brightness of an optical image on the CCD 122.

The shutter controller 126 controls running of a first curtain and a second curtain of the shutter 121. Specifically, the shutter controller 126 controls operation of the shutter 121 such that the first and second curtains can run at a shutter speed computed by the camera microcomputer 131.

The camera microcomputer 131 executes predetermined functions according to the operation states of the power switch 134, the shutter switch 135, and the various key switches 136, and an output signal from the attachment detector 133.

The power switch 134 is a switch to start the operation of the camera system. When recognizing that the power switch 134 is turned on, the camera microcomputer 131 starts functions such as photometric measurement, range measurement, and display.

When recognizing that the shutter switch 135 is turned on, the camera microcomputer 131 sends an instruction for starting an exposure operation to the shutter controller 126.

The various key switches 136 include, for example, a switch for switching a camera mode (TV priority, AV priority, manual, program, and so on), a switch for setting single AF or continuous AF for continuous focusing of a subject in an AF mode, and a switch for setting evaluative metering, center-weighted metering, selective area metering, or spot metering of a metering mode. When recognizing that at least one of the various key switches 136 is operated, the camera microcomputer 131 executes the corresponding function.

The attachment detector 133 is a switch for detecting mechanical attachment/detachment of the interchangeable lens 100 to/from the camera body 120 and outputting a detection signal to the camera microcomputer 131. Although in the present embodiment the attachment detector 133 is provided independently, the attachment detector 133 may be provided integrally with the communication unit 137.

The shutter 121 includes a first curtain and a second curtain whose operations are controlled by the shutter controller 126. The shutter 121 makes an optical image incident to the CCD 122 for a predetermined time through the zoom lens 101, the focus lens 102, and the iris 103.

The CCD 122 converts the incident optical image into electrical signal to output it. Instead of a CCD image sensor, other imaging devices such as a CMOS image sensor may be used.

The signal processor 123 applies various signal processing, such as A/D conversion, image quality adjustment, and an image compression, on the electrical signal outputted from the CCD 122 to output image data. Although in the present embodiment the signal processor 123 has a single configuration, an analog signal processor and a digital signal processor of the signal processor 123 may be separately provided. Note also that the signal processor 123 may be configured integrally with the camera microcomputer 131, the display controller 129, the card interface 124, and the like.

The card interface 124 enables recording of the image data outputted from the signal processor 123 to the information recording medium 125. Note that the card interface 124 enables not only recording of data to the information recording medium 125 but also reading of data recorded from the information recording medium 125.

The information recording medium 125 is composed of, for example, a removable memory card including a semiconductor memory but may be any other medium, such as a disk-like recording medium, as long as the medium can record at least digital images.

Note that, for simplification of description, in FIG. 1, a battery, a power supply circuit, and the like, are omitted.

2. Operation

Figure 2:
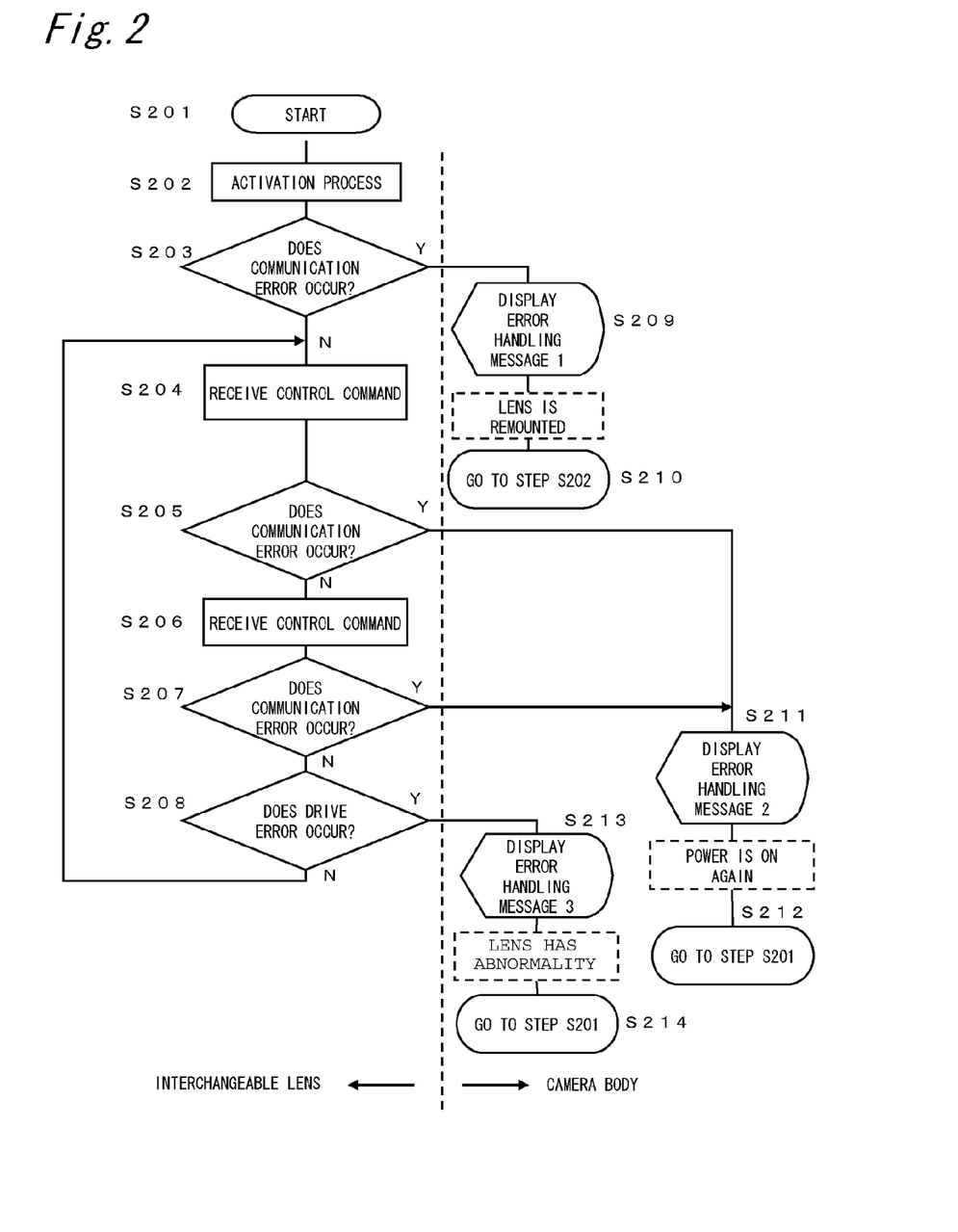
FIG. 2 is a flowchart of the interchangeable lens type camera system.

FIG. 2 is a flowchart showing the operation of the interchangeable lens type camera system according to the present embodiment. FIG. 2 particularly shows a process performed when an error occurs.

Figure 3A:
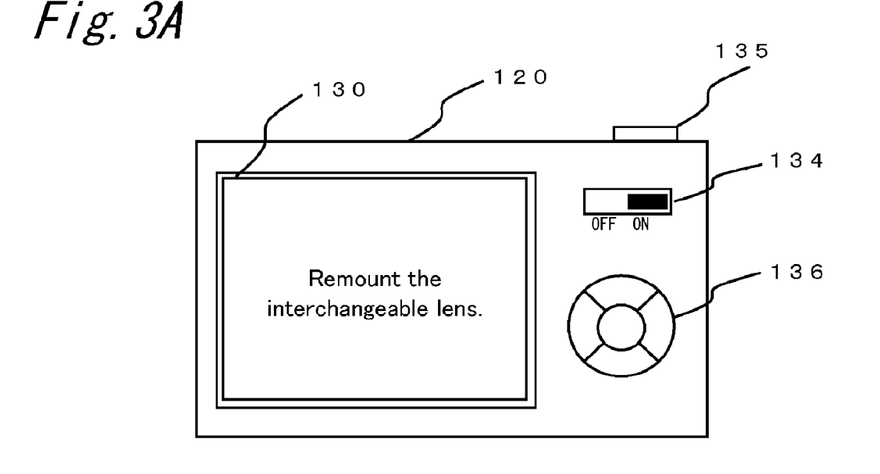
FIG. 3A is a diagram showing exemplary display of an error handling message of the interchangeable lens type camera system.
Figure 3B:
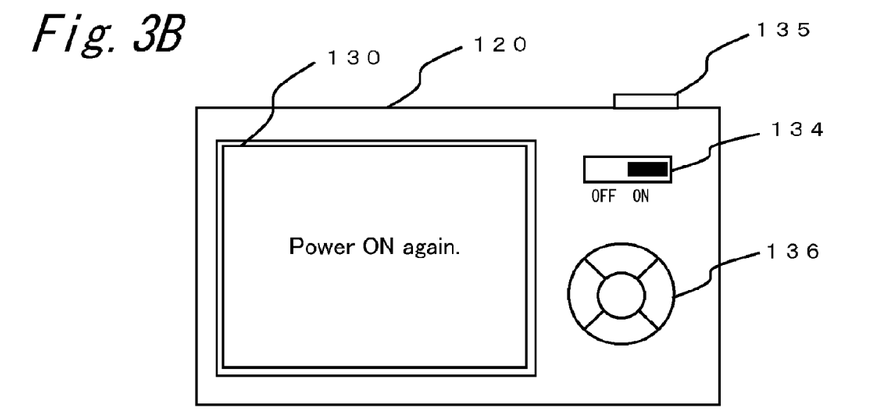
FIG. 3B is a diagram showing exemplary display of an error handling message of the interchangeable lens type camera system.
Figure 3C:
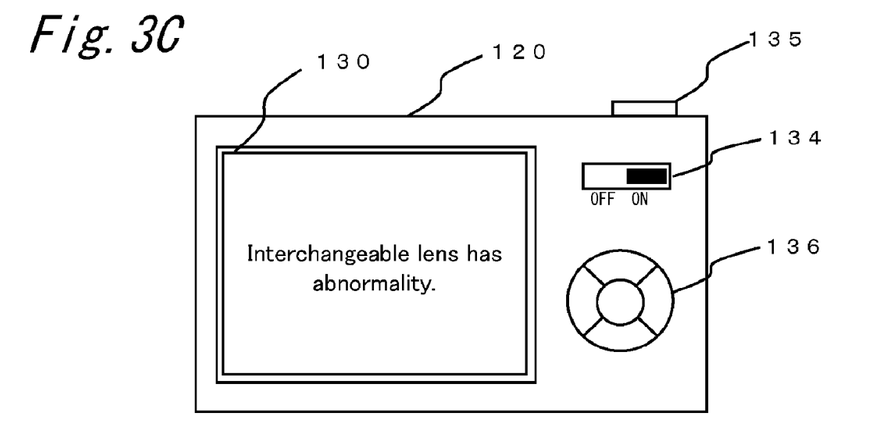
FIG. 3C is a diagram showing exemplary display of an error handling message of the interchangeable lens type camera system.

FIGS. 3A to 3C are diagrams showing exemplary displays of error handling messages of the interchangeable lens type camera system. FIG. 3A shows an exemplary display of an error handling message to be displayed when an error occurs at the time of activation. FIG. 3B is an exemplary display of an error handling message to be displayed when an error occurs after the activation. FIG. 3C shows a different exemplary display of an error handling message to be displayed when an error occurs after the activation. Error handling message 1 shown in FIG. 3A "Remount the interchangeable lens" is an example of a first error handling message. Error handling message 2 shown in FIG. 3B "Power ON again" is an example of a second error handling message. Error handling message 3 shown in FIG. 3C "Interchangeable lens has abnormality" is an example of a third error handling message.

With reference to FIGS. 1, 2, and 3A to 3C, the operation of the interchangeable lens type camera system according to the present embodiment performed when an error occurs will be described below step by step. Note that the following operational description is provided assuming that the interchangeable lens 100 is mechanically attached to the camera body 120.

2-1. At Activation

Step S201:

When the power switch 134 is turned on by a user, the camera microcomputer 131 recognizes the turn-on and supplies power to each unit of the camera body 120. If the interchangeable lens 100 is attached, then the camera microcomputer 131 also starts to supply power to the interchangeable lens 100. Whether the interchangeable lens 100 is attached is determined by an output from the attachment detector 133.

Step S202:

Then, an activation process of the interchangeable lens 100 is performed. Specifically, the camera microcomputer 131 performs control to send an activation command to the lens microcomputer 108 through the second communication terminals 113b and the first communication terminals 113a to activate the interchangeable lens 100. When receiving the activation command from the camera microcomputer 131, the lens microcomputer 108 sends lens data stored in the memory 112 to the camera microcomputer 131. When receiving the lens data, the camera microcomputer 131 stores the lens data in the memory 132. The stored lens data is used, for example, to drive the focus lens 101 and the iris 103.

The above described process is the activation process of the interchangeable lens 100 (step S202). The camera microcomputer 131 can recognize completion of the activation process of the interchangeable lens 100, by receiving lens data (information on the interchangeable lens 100) which is predetermined information.

In the present embodiment, although the completion of an activation process of the interchangeable lens 100 is recognized by the reception of lens data, information indicating that the interchangeable lens 100 has completed an activation process (e.g., a flag notifying that shooting can be performed) may be sent to the camera microcomputer 131 from the lens microcomputer 108. In such a case, lens data may or may not be sent to the camera microcomputer 131 from the lens microcomputer 108.

Step S203:

The error detector 138 checks whether a communication error has occurred in the activation process of the interchangeable lens 100 (step S202). If a communication error has not occurred, then the processing proceeds to reception of a control command (step S204). If a communication error has occurred, then the processing proceeds to display of error handling message 1 (step S209).

Step S209:

If a communication error has occurred in the activation process of the interchangeable lens 100 (step S202), then the error handling message 1 at the activation "Remount the interchangeable lens" (see FIG. 3A) is displayed on the liquid crystal display unit 130. When a communication error has occurred in the activation process of the interchangeable lens 100, it means that a communication error has been detected before or when the lens data is received from the interchangeable lens 100. In this case, the following causes are considered: power has not been supplied to the interchangeable lens 100; the interchangeable lens 100 has not been normally reset; and the connection between the second communication terminals 113b and the first communication terminals 113a is bad. In such a case, attaching the interchangeable lens 100 again may recover the communication. Hence, in order to prompt the user to attach the interchangeable lens 100 again, the error handling message 1 "Remount the interchangeable lens" is displayed.

Step S210:

The camera microcomputer 131 is monitoring an output from the attachment detector 133. After the error handling message 1 "Remount the interchangeable lens" is displayed, when it is detected by the attachment detector 133 that the interchangeable lens 100 is detached from the camera body once and then attached (mechanically connected) to the camera body again by the user, the camera microcomputer 131 makes the error handling message 1 at the activation "Remount the interchangeable lens" (see FIG. 3A) displayed on the liquid crystal display unit 130 disappear and returns again to an activation process of the interchangeable lens 100 (step S202).

2-2. After Activation

If a communication error has not occurred in the activation process of the interchangeable lens 100 (step S202), then normal operation for after activation (steps S204 to S208) is performed. In the normal operation for after activation, the lens microcomputer 108 basically repeats: receiving a control command from the camera microcomputer 131 (step S204), performing a process according to the control command (step S206), and sending a result of the process to the camera microcomputer 131. The control command includes, for example, a command to drive the focus lens 102 and the iris 103. The normal operation for after activation (steps S204 to S208) is an example of a second operation state of the interchangeable lens. The operation for after activation will be specifically described below step by step.

Step S204:

A control command is sent to the lens microcomputer 108 from the camera microcomputer 131. The lens microcomputer 108 receives the control command.

Step S205:

The error detector 138 checks whether a communication error has occurred in the sending of a control command to the lens microcomputer 108 from the camera microcomputer 131 (step S204). If a communication error has not occurred, then the processing proceeds to a control command process (step S206) so that the lens microcomputer 108 performs a control command process according to an instruction of the control command from the camera microcomputer 131 (step S206). If a communication error has occurred, then the processing proceeds to a process of displaying error handling message 2 (step S211).

Step S211:

If a communication error has occurred in reception of the control command (step S204), then the error handling message 2 for after activation "Power ON again" (see FIG. 3B) is displayed on the liquid crystal display unit 130. The occurrence of a communication error in reception of a control command (step S204) means that a communication error has been detected after lens data is normally received from the interchangeable lens 100. When a communication error has occurred in reception of a control command (step S204), the communication error may have been caused by the influence of external noise. In such a case, turning on power to the camera body 120 again may allow communication to be normally performed. Hence, in order to prompt the user to turn on power again, the error handling message 2 "Power ON again" is displayed on the liquid crystal display unit 130.

Step S212:

When the user turns on power again after the error handling message 2 "Power ON again" is displayed, the process starts again from the "start" step (step S201).

Step S206:

If a communication error has not occurred in reception of a control command (step S204), then the lens microcomputer 108 controls the focus motor driver 106 to move the focus lens 102 to a predetermined position, according to the control command sent from the camera microcomputer 131. Further, the lens microcomputer 108 controls the iris motor driver 107 such that the aperture size becomes a predetermined size. When completing the control of the focus lens 102 and the iris 103, the lens microcomputer 108 sends a result of the control command process to the camera microcomputer 131.

Step S207:

The error detector 138 checks whether a communication error has not occurred in the sending of the result of the control command process to the camera microcomputer 131 from the lens microcomputer 108 in the control command process (step S206). If a communication error has not occurred, then the processing proceeds to perform a check of a drive error (step S208). If a communication error has occurred, then the processing proceeds to display of error handling message 2 (step S211).

Step S211:

If a communication error has occurred in the control command process (step S206), then the error handling message 2 for after activation "Power ON again" (see FIG. 3B) is displayed on the liquid crystal display unit 130. The reason why the error handling message 2 is displayed is because the occurrence of a communication error in the control command process (step S206) means that a communication error is detected after lens data is normally received from the interchangeable lens 100.

When a communication error has occurred in the sending of a result of the control command process to the camera microcomputer 131 from the lens microcomputer 108 in the control command process (step S206), the communication error may be caused by the influence of external noise. In such a case, turning on power again may recover the communication. Hence, in order to prompt the user to turn on power again, the error handling message 2 "Power ON again" is displayed on the liquid crystal display unit 130.

Step S212:

When the user turns on power again after the error handling message 2 is displayed, the process starts again from the "start" step (step S201).

Step S208:

If a communication error has not occurred in the control command process (step S206), then the camera microcomputer 131 checks whether a drive error has occurred. This check is done based on the result of the control command process sent from the lens microcomputer 108. Specifically, after the lens microcomputer 108 performs a process according to a control command from the camera microcomputer 131, the lens microcomputer 108 sends a result of the process to the camera microcomputer 131. Based on the result of the process, the camera microcomputer 131 determines whether a result of the process according to the control command is obtained, thus to determine whether a drive error has occurred.

For example, when receiving a control command to move a lens to a desired position from the camera microcomputer 131, the lens microcomputer 108 sends, to the camera microcomputer 131, a position obtained as a result of moving the lens according to the control command, as a result of the process. Based on the position received as the result of the process, the camera microcomputer 131 can determine whether an operation has been normally performed. Specifically, when the position received as the result of the process is not the desired position (that is, abnormal data is detected in the communication data), the camera microcomputer 131 can determine that a drive error has occurred. Alternatively, when the camera microcomputer 131 does not receive a result of the process from the lens microcomputer 108 for more than a predetermined time (that is, timeout is detected), the camera microcomputer 131 can determine that a drive error has occurred.

As such, based on a result of a control command process from the lens microcomputer 108, it is determined whether a drive error has occurred (the drive unit of the focus lens 102 and/or the iris 103 does not normally operate due to an electrical or mechanical abnormality).

If it is determined based on the result of the control command process that a drive error has not occurred, then the processing returns again to reception of a control command (step S204) so that the camera microcomputer 131 sends a next control command to the lens microcomputer 108. If it is determined that a drive error occurs in the result of the control command process, then the processing proceeds to a process of displaying error handling message 3 (step S213).

Step S213:

If a drive error has occurred in the control command process (step S206), then the error handling message 3 for after activation "Interchangeable lens has abnormality" (see FIG. 3C) is displayed on the liquid crystal display unit 130. That is, when a drive error has occurred, the drive unit of the focus lens 102 and/or the iris 103 has an electrical or mechanical abnormality. Thus, in order to prompt the user to request a repair of the interchangeable lens 100, the error handling message 3 "Interchangeable lens has abnormality" (see FIG. 3C) is displayed on the liquid crystal display unit 130.

Step S214:

When the user turns on power again after the error handling message 3 "Interchangeable lens has abnormality" (see FIG.

3C) is displayed, the processing returns again to the "start" step (step S201) to start the process.

As described above, according to the present embodiment, there is an advantage in that an appropriate handling method according to an error state when an error occurs can be presented to a user.

3. Others

In the present embodiment, when a communication error or a drive error is detected, an error handling message is immediately displayed. However, when a communication error or a drive error is detected, an error handling message may be displayed when a communication error or a drive error continues to occur even after retry is performed a predetermined number of times at a fixed interval.

INDUSTRIAL APPLICABILITY

The aforementioned embodiments are useful for an interchangeable lens type camera system including a camera body and an interchangeable lens which is mountable to a camera body and can communicate information between the camera body and the interchangeable lens.

Although the aforementioned description has been provided in connection with specified embodiments thereof, many other modifications, corrections and applications are apparent to those skilled in the art. Therefore, the embodiments are not limited by the disclosure provided herein. The present disclosure relates to subject matter contained in Japanese Patent Application No. 2008-069028, filed on Mar. 18, 2008, which is expressly incorporated herein by reference in its entirety.

What is claimed is:

1. An interchangeable lens type camera system comprising:
   a camera body having a first communication unit; and
   an interchangeable lens mountable to the camera body and having a second communication unit operable to communicate with the first communication unit, wherein the camera body includes
      an attachment detector operable to detect whether the interchangeable lens is mechanically attached to the camera body,
      an error detector operable to detect, in a state that the interchangeable lens is mechanically attached to the camera body, whether a communication error occurs between the first communication unit and the second communication unit, and
      a display unit operable to display a first error handling message when the error detector detects the communication error at a time of activation of the interchangeable lens, and display a second error handling message when the error detector detects the communication error after activation of the interchangeable lens.

2. The interchangeable lens type camera system according to claim 1, wherein the time of activation of the interchangeable lens is no later than a time the camera body receives predetermined information from the interchangeable lens.

3. The interchangeable lens type camera system according to claim 2, wherein the predetermined information is information indicating that the interchangeable lens has completed an activation process.

4. The interchangeable lens type camera system according to claim 2, wherein the predetermined information is information of the interchangeable lens which is stored in the interchangeable lens.

5. The interchangeable lens type camera system according to claim 1, wherein the first error handling message is a message for prompting a user to remount the interchangeable lens, and the second error handling message is a message for prompting the user to power on the camera body.

6. The interchangeable lens type camera system according to claim 1, wherein the display unit displays a third error handling message when it is determined that there is abnormality in driving the interchangeable lens in cases where the error detector detects timeout or abnormal data in communication data.

7. The interchangeable lens type camera system according to claim 6, wherein the third error handling message is a message indicating an abnormal state of the interchangeable lens.

8. A camera body to which an interchangeable lens having a second communication unit is mountable, comprising:
   a first communication unit operable to communicate with the second communication unit;
   an attachment detector operable to detect whether the interchangeable lens is mechanically attached to the camera body;
   an error detector operable to detect, in a state that the interchangeable lens is mechanically attached to the camera body, whether a communication error occurs between the first communication unit and the second communication unit; and
   a display unit operable to display a first error handling message when the error detector detects the communication error at a time of activation of the interchangeable lens, and display a second error handling message when the error detector detects the communication error after activation of the interchangeable lens.

9. The camera body according to claim 8, wherein the time of activation of the interchangeable lens is no later than a time the camera body receives predetermined information from the interchangeable lens.

10. The camera body according to claim 9, wherein the predetermined information is information indicating that the interchangeable lens has completed an activation process.

11. The camera body according to claim 9, wherein the predetermined information is information of the interchangeable lens which is stored in the interchangeable lens.

12. The camera body according to claim 8, wherein the first error handling message is a message for prompting a user to remount the interchangeable lens, and the second error handling message is a message for prompting the user to power on the camera body.

13. The camera body according to claim 8, wherein the display unit displays a third error handing message when it is determined that there is abnormality in driving the interchangeable lens in cases where the error detector detects timeout or abnormal data in communication data.

14. The camera body according to claim 13, wherein the third error handling message is a message indicating an abnormal state of the interchangeable lens.

15. An interchangeable lens type camera system comprising:
   a camera body having a first communication unit; and
   an interchangeable lens mountable to the camera body and having a second communication unit operable to communicate with the first communication unit, wherein:
   the camera body includes:
      an attachment detector operable to detect whether the interchangeable lens is mechanically attached to the camera body;

an error detector operable to detect, in a state that the interchangeable lens is mechanically attached to the camera body, whether a communication error occurs between the first communication unit and the second communication unit; and a display unit operable to display a first error handling message when the error detector detects the communication error during an activation of the interchangeable lens, display a second error handling message when the error detector detects the communication error after activation of the interchangeable lens, and displays a third error handing message when it is determined that there is abnormality in driving the interchangeable lens in cases where the error detector detects timeout or abnormal data in communication data.

16. The camera body according to claim 15, wherein the activation of the interchangeable lens is no later than a time the camera body receives predetermined information from the interchangeable lens.

17. The interchangeable lens type camera system according to claim 16, wherein the predetermined information is information indicating that the interchangeable lens has completed an activation process.

18. The interchangeable lens type camera system according to claim 15, wherein the first error handling message is a message for prompting a user to remount the interchangeable lens, the second error handling message is a message for prompting the user to power on the camera body, and the third error handling message is a message indicating an abnormal state of the interchangeable lens.

19. The interchangeable lens type camera system according to claim 18, wherein the third error handling message indicating the abnormal state of the interchangeable lens is a message prompting the user to request a repair of the interchangeable lens.

* * * * *